H. WINDHOFF.
HOISTING GEAR.
APPLICATION FILED MAR. 7, 1908.

1,021,347.

Patented Mar. 26, 1912.

4 SHEETS—SHEET 1.

Witnesses
P. W. Pezzetti
E. Batchelder

Inventor
Hans Windhoff
by [signature]
attys.

H. WINDHOFF.
HOISTING GEAR.
APPLICATION FILED MAR. 7, 1908.

1,021,347.

Patented Mar. 26, 1912.
4 SHEETS—SHEET 2.

Witnesses
P. W. Pezzetti
E. Batchelder

Inventor
Hans Windhoff

H. WINDHOFF.
HOISTING GEAR.
APPLICATION FILED MAR. 7, 1908.

1,021,347.

Patented Mar. 26, 1912.
4 SHEETS—SHEET 3.

Witnesses

Inventor

H. WINDHOFF.
HOISTING GEAR.
APPLICATION FILED MAR. 7, 1908.

1,021,347.

Patented Mar. 26, 1912.
4 SHEETS—SHEET 4.

Witnesses

Inventor
Hans Windhoff

UNITED STATES PATENT OFFICE.

HANS WINDHOFF, OF SCHÖNEBERG, NEAR BERLIN, GERMANY.

HOISTING-GEAR.

1,021,347.   Specification of Letters Patent.   Patented Mar. 26, 1912.

Application filed March 7, 1908. Serial No. 419,647.

*To all whom it may concern:*

Be it known that I, HANS WINDHOFF, engineer, of 8ª Mühlenstrasse, Schöneberg, near Berlin, Germany, have invented certain new and useful Improvements in Hoisting-Gears, of which the following is a specification.

The present invention refers to a hoisting gear or an arrangement or a pulley block in which a friction coupling is released by a pawl gear so as to allow a rotation for hoisting up the load, whereas the coupling body is coupled with the housing of the hoisting gear by the pawl in the opposite direction of rotation for lowering the load. The axial pressure for engaging this friction coupling is produced by the load itself, by the gear wheel of the coupling shaft having slanting teeth and engaging with a gear wheel suspending the load either directly or indirectly, and likewise having slanting teeth; the incline of said teeth is arranged in such a manner, that as said above under the influence of the load the shaft with the former gear wheel and the coupling is caused to engage the friction coupling. The heavier the load on the hoisting gear is, the greater such axial pressure will be and consequently, even if the hoisting power should cease, the heavier the load is the greater resistance to its descent will be presented by the friction coupling.

Figure 1:
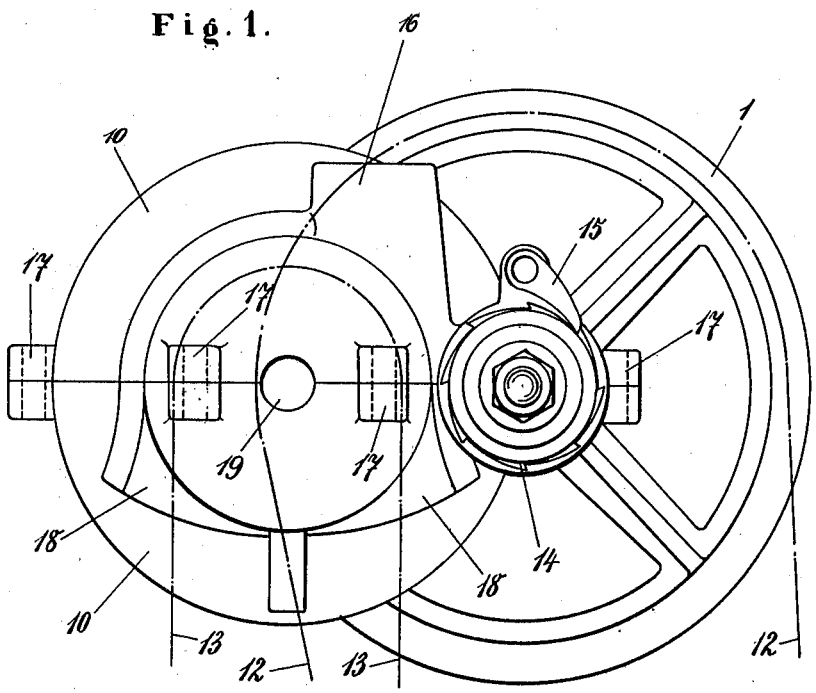
Figure 2:
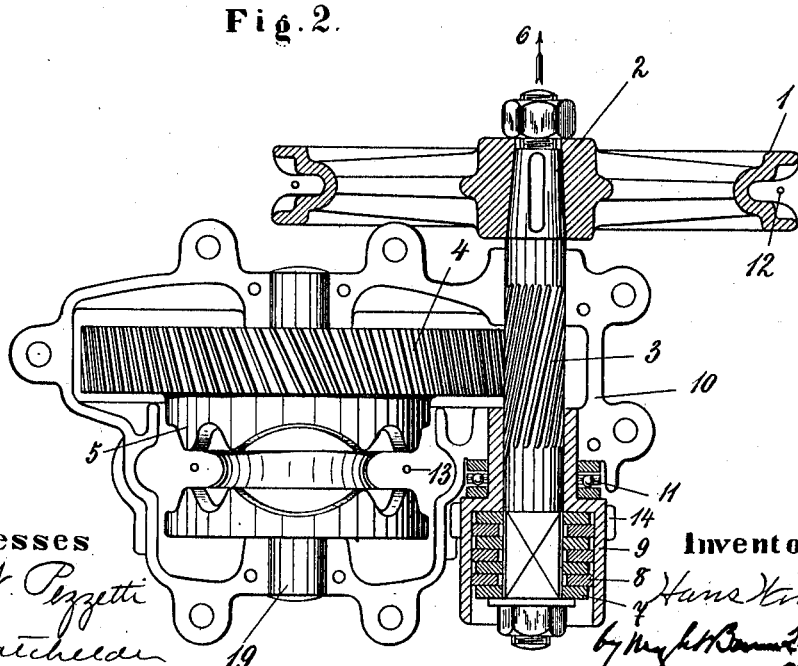
Figure 3:
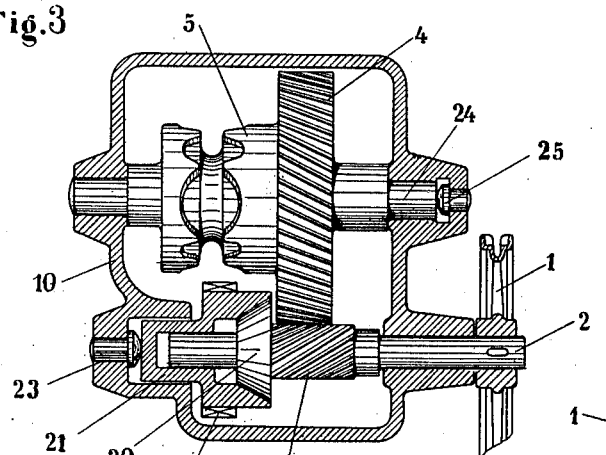
Figure 4:
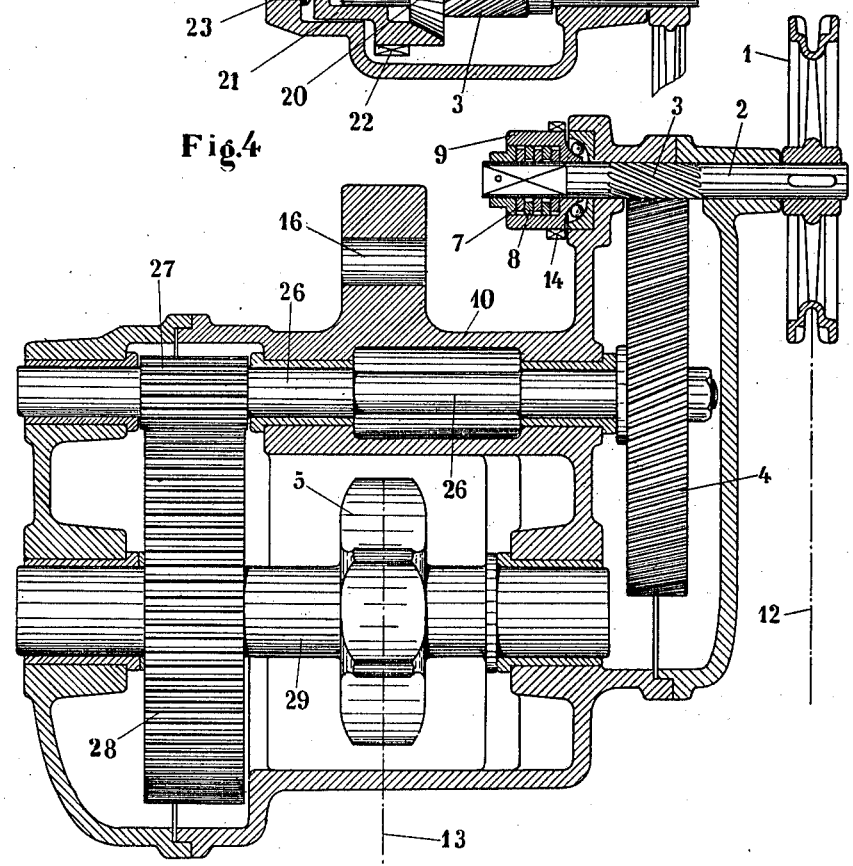
Figure 5:
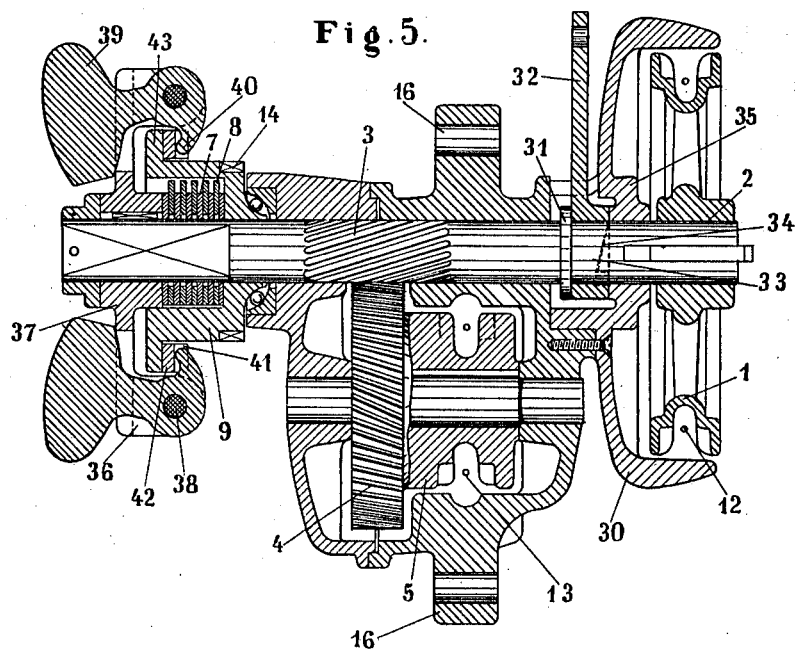
Figure 6:
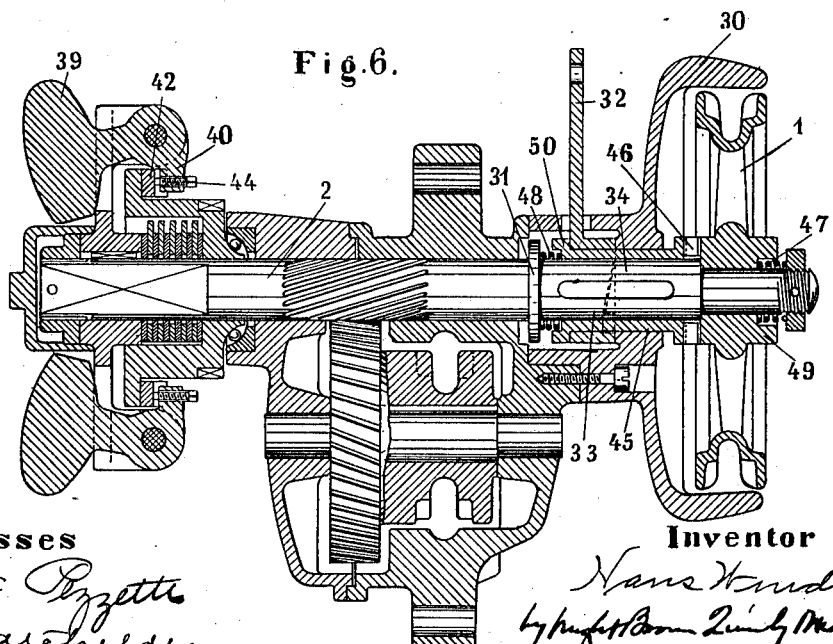
Figures 7, 8:
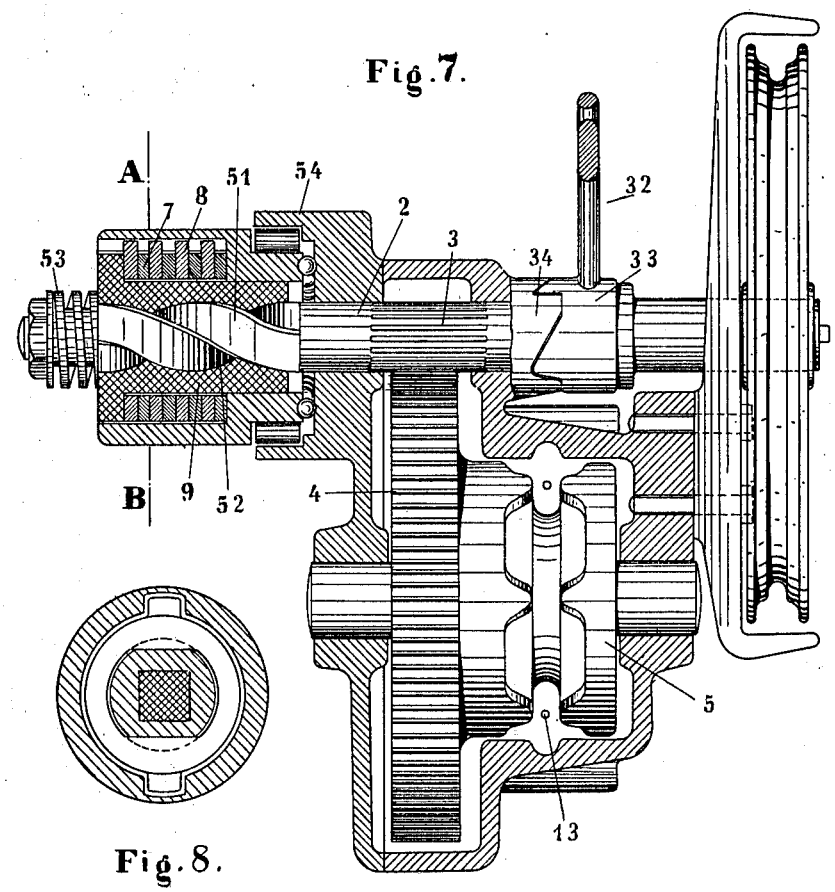

This simple modification of the invention is illustrated in Figures 1-4, Fig. 1 being a side elevation, Fig. 2 a horizontal section through a pulley block with laminated friction coupling, Fig. 3 a horizontal section through a pulley block with conical friction coupling, Fig. 4 a vertical section through a hoisting gear with increased ratio of transmission by means of an intermediate train gear. Figs. 5 and 6 are sectional views of further modifications of the invention in which a centrifugal brake is employed. Fig. 7 lastly is a section through another modification the action of the axial motion being transferred into the coupling itself, so that the teeth can be straight. Fig. 8 is a sectional view taken on the line A—B, Fig. 7.

Like references in the various figures refer to the same or corresponding parts.

In Figs. 1 and 2, 1 is the chain wheel, on the circumference of which the hand chain is mounted. This chain wheel is fitted to a shaft 2 which has cut into its middle portion slanting teeth 3, which engage with correspondingly slanting teeth of gear 4. This gear 4 is rigidly secured to the chain nut 5, which carries the load chain, so that the load will in consequence of the obliquity of the gear wheels have the inclination to move the shaft in the direction of the arrow 6, axially. This motion is limited by a number of coupling laminations 7, which are non-rotatably fitted to the shaft 2, and 8 which are fitted non-rotatably to the housing 9 of the coupling, but being there adjustable. The laminations 7 and 8 are thus forced against each other under action of the load, and this the more, the greater the load is. In order to avoid a too great friction of the part —9— against the main body of the gear 10 a ball bearing 11 is arranged between the same. If the power on the hand chain 12 passing over the chain wheel 1 ceases, the load will remain suspended without change of the height from the load chain 13 passing over the chain nut 5, as the housing —9 will be secured against reversing by means of ratchet teeth 14 or a pawl 15 respectively. When the hand chain 12 is moved in a direction opposite to the former one for raising the load, the latter can be lowered, a corresponding friction being produced between the laminations 7 and 8.

In the modification shown in Figs. 1 and 2 it must be mentioned, the lug 16 serves to receive the suspension hook, which is screwed into it, whereas the lugs 17 are intended for receiving the bolts for uniting the two halves of the gear housing. At 18 the exit and the entrance openings for the load chain 13 is provided, the latter being passed over the chain nut 5 fitted on pin 19.

The modification shown in Fig. 3 differs from the one described above only by the laminated coupling being replaced by a conical coupling consisting of a cone 20 which is fitted on the gear wheel 3 and the hand chain wheel 1 to shaft 2 and a corresponding hollow cone 21 which is secured by ratchet gear 22 against reversing for the purpose of maintaining the load, and bears against a spur cone 23 to take up the axial pressure. The axial pressure acts on the shaft 24 which carries the other gear wheel 4, fitted to the chain nut 5, in an opposite direction, so that for receiving the axial pressure of this shaft 24 a spur cone 25 is provided on the opposite side of the gear housing.

The modification illustrated in Fig. 4 differs from those above described by the ratio of transmission being increased by a chain gear being arranged between the hand chain shaft and the load chain shaft, so that greater loads can be raised by the hoisting gear. The hand chain wheel is again fitted to a shaft 2, which has both the slanting teeth 3 also on its square cut end the laminations 7 and the housing 9 carrying the laminations 8 and the ratchet gear 14. However the gear wheel 4 engaging with the slanting teeth 3 and likewise having slanting teeth is not connected directly with the load chain wheel 5 but indirectly by means of an intermediate shaft 26 with a gear wheel 27 which engages with a corresponding gear wheel 28 on the load chain wheel shaft 29. The suspension hook is fitted for this hoisting gear into the lug 16.

In the modification shown in horizontal section in Fig. 5 two lugs —16 are provided for suspension from a hoop or the like, further a chain guide hoop 30 is provided for guiding the hand chain 12 passing over the chain wheel 1. Whereas there exists no difference as to the action between the power chain wheel 1 on shaft 2 with gear wheel 3 and the load chain 13 passing over the chain nut 5 with gear wheel 4, between this and the above described modifications, the following arrangement has been here provided for lowering the load automatically instead of necessitating a pull on the hand chain in the opposite direction: The shaft 2 has a shoulder 31 against which bears the one side of the boss of a lever 32. The other side of said boss has oblique recesses 33 which bear against corresponding oblique projections 34 on the boss 35 of the housing of the chain guide hoop 30. If now lever 32 is pulled down by means of a cord, chain or the like, or turned thereby, the bevels 33, 34 will move shaft 2 in direction toward the laminated coupling so that axial pressure acting in the opposite direction caused by the load chain 13 and the obliquity of the gears 3 and 4 is compensated and with the same also the friction between the laminations 7 and 8. If now the housing 9 of the coupling is prevented by the ratchet teeth 14 from reversing, the laminations 7 and 8 will in consequence of the axial pressure previously produced by the load and the reduced friction between each other allow of the shaft 2 reversing, so that the load can sink. In order however that such sinking of the load does not take place too rapidly a centrifugal brake is provided, which will force the laminations 7 and 8 against each other in case the shaft 2 should revolve too quickly. This centrifugal governor consists of the following parts: A boss 37 having spokes or a disk 36 is fitted to shaft 2. On pins 38 of arms 36 are fitted swiveling weights 39 which are made as angle levers or bell cranks in such a manner that their other ends have lugs 40. These enter into notches 41 on a disk 42 which is rotatably arranged on the housing 9 of the coupling and bears against the shoulder 43 of the same, or is pressed against this shoulder as soon as the centrifugal weights 39 are moved out in consequence of too fast a speed of the shaft 2. Thereby the housing 9 is forced against the boss 37 and thus also the laminations 7 and 8 the more against each other the more the speed of shaft 2 increases.

The modification, Fig. 6, otherwise identical with the above, shows the only difference referring to the action of the centrifugal governor, that the arms 40 of the centrifugal weights 39 are not pressed directly against the disk 42 but by means of set screws 44. Further an arrangement has been made in the hand chain wheel, by which the hand chain wheel or the hand chain is prevented from running while the load is being automatically lowered by lever 32, so that said chain will remain unmovable. This arrangement operates as follows: The hand chain wheel 1 and also a sleeve 45 are provided with coupling teeth 46 which are pressed by compression springs 47 and 48 in the ordinary manner against each other. The hub of the chain wheel 1 bears against the shoulder 49 on shaft 2, under the influence of spring 47. If now the hand lever 32 is turned by a suitably provided pull gear, the bevel 33 of its boss or 34 of the housing of the hand chain guide 30 will firstly effect a disengaging of the teeth 46, by the other side of the boss of the hand lever 32 resting against a shoulder 50 on the sleeve 45 axially adjustable but not rotatable on the shaft, and pushing the same forward until said shoulder 50 of sleeve 45 bears up against the shoulder 31 of shaft 2. When this is the case the coupling teeth 46 will be pulled apart, the hand chain wheel 1 is thus disconnected from the shaft 2. Only when the lever 32 is turned further the shaft 2 is axially moved and this has the effect the same as described for Fig. 5.

The modification shown in Fig. 3 differs horizontal section is without this hand chain wheel disconnecting gear but with lever 32 for disengaging the lowering gear for the load, whereas Fig. 8 shows a cross section through the coupling arrangement according to line A—B. This modification further shows the difference compared with all the others hereinbefore described, that the effect of the load suspending from the chain nut 5 or from the chain 13 passed around the same on the axial adjustment of shaft 2 for compressing the laminations 7 and 8 of the coupling is not produced by obliquity of the gears 3 and 4, but by a correspondingly highly pitched thread 51 on shaft 2, on which thread is fitted a coupling sleeve 52 provided with a corresponding thread, and on the latter only the laminations 7 are arranged. For commencing the axial adjustment of the coupling 52 on the thread 51 here however a pressure spring 53 is required and after the same has come into action, as soon as the laminations 7 and 8 rub slightly against each other, the load will act in such a manner on the laminated coupling that the single laminations are pressed the more against each other the greater the load, as is also the case with the hereinbefore described modifications. The bevels 33 and 34 must here serve to push the shaft 2 to the right, if the load is to be lowered.

The ratchet gear for preventing a reversing motion of the coupling 9 is made according to Fig. 7 not by beveled teeth and a pawl, but by clamping rollers which are fitted into bevel recesses of the coupling 9 and are pressed against the inside periphery of the housing extension 54, as such gears are known in bicycle manufacture for obtaining the free wheel action.

When the present invention is employed as a winch instead of the hand chain wheel 1 also another means for transferring the power say from an electric motor may be provided.

Having now described my invention, what I claim and desire to secure by Letters Patent of the United States is:

1. In a hoisting gear, winch or pulley block, a housing, a pair of gear wheels engaging with each other and having slanting teeth, the shafts of one of said gears being axially adjustable under the effect of said slanting teeth, a coupling engaged by such axial thrust, one member of said coupling being connected with one of the shafts, the other member being connected by means of a ratchet with the housing so as to be able to turn in one direction only, a centrifugal brake governor on the coupling controlling the speed of the sinking load and the coupling shaft respectively, substantially as and for the purpose described.

2. In a hoisting gear, winch or pulley block, a housing, a pair of gear wheels engaging each other and having slanting teeth, the shaft of one of said gear wheels being axially adjustable under the effect of said slanting teeth, means for driving said shaft, a coupling engaged by such axial thrust, one member of the coupling being connected with one of the shafts, the other member being connected with the housing so as to be able to turn in one direction only, a centrifugal brake governor on the friction coupling controlling the speed of the sinking load and the coupling shaft respectively, and means for automatically disconnecting the driving means when the load sinks, substantially as and for the purpose described.

In testimony whereof I have affixed my signature, in presence of two witnesses.

HANS WINDHOFF.

Witnesses:
HENRY HASPER,
WOLDEMAR HAUPT.

---

Copies of this patent may be obtained for five cents each, by addressing the "Commissioner of Patents, Washington, D. C."